United States Patent Office

3,100,759
Patented Aug. 13, 1963

3,100,759
METHODS OF PREPARING ELASTOMERS OF THE POLYURETHANE TYPE
Gabriel Xavier Roger Boussu, Chamalieres, and Louis Pierre Francois Andre Neuville and Jean-Marie Massoubre, Clermont-Ferrand, France, assignors to Michelin & Cie, Clermont-Ferrand, France
No Drawing. Filed June 23, 1960, Ser. No. 38,128
Claims priority, application France June 26, 1959
10 Claims. (Cl. 260—77.5)

This invention relates to improved synthetic elastomers of the polyurethane type, and to an improved method for their preparation. In particular, this invention relates to polyurethane elastomers of the type used as substitutes for natural rubber products in the manufacture of tires, belts, pipes and molded laminated reinforced products.

In a copending application, Serial No. 19,997 filed April 5, 1960, a method of preparing elastomers of the polyurethane type was disclosed. This method comprised reacting together in a polymerizing reaction, a polymeric dihydroxy compound, a bifunctional compound reactive with diisocyanates, and an organic diisocyanate, the latter being used in excess, to result in a branched chain elastomer wherein free —NCO groups terminate all of the chains of the branched end products. The method also involved the steps of substituting hydroxyl groups for the free —NCO groups to block immediate cross linking, and subsequently effecting desired cross linking and curing by adding a polyisocyanate and vulcanizing the elastomer under pressure at an elevated temperature.

It was found that by using a monofunctional compound with only one group reactive with a diisocyanate, in place of the bifunctional compound, characterized as having a non-benzenoid unsaturation, that a non-vulcanized elastomer was prepared showing better preservability and less tendency towards premature vulcanization or fixation known as "scorching."

It has now been discovered, according to the objects of the present invention, that terminal unsaturation can be introduced into an elastomer molecule obtained by reacting together a polymeric dihydroxy compound such as a polyether, polyesters, polyester-esters, polyamides and a diisocyanate, and subsequent vulcanization of the elastomer by a peroxide becomes possible resulting in improved mechanical properties, improved resistance to damage by heat, and the like.

Essentially, the terminal unsaturation is achieved by introducing into the elastomer molecule a compound monofunctional with respect to diisocyanates that is; having a single terminal function reactive with respect to diisocyanate, and which shall hereinafter be designated an unsaturated monofunctional compound having two double bond radicals preferably allylic radicals, and the following general formula:

wherein:
$Z_1$ and $Z_2$ are identical or different monovalent organic radicals, having a double bond, and are preferably aliphatic radicals containing not more than ten carbon atoms.

As a general practice, $Z_1$ and $Z_2$ are vinyl and allyl radicals, and may comprise aromatic, ether, carboxyl, and carbonyl groups or other substituents inert with respect to diisocyanates.

Q is a trivalent radical; and H is a substitutable hydrogen atom of the single terminal function of the trivalent radical, Q, reactive with respect to diisocyanates;

In the simplest case the unsaturated compound monofunctional with respect to diisocyanates is

with the trivalent radical Q being N≡. Q may also be a hydrocarbon radical, preferably an aliphatic radical with a single terminal function reactive with diisocyanates. Examples of single reactive functions are =NH, —OH, —NH₂—CONH₂, —SH, and —COOH. Of the above, hydroxyl and amine functions are preferred, so that the products obtained from the reaction are alcohols or amines.

Examples of suitable compounds are diallyloxy propanol, allyl vinyl carbinol, allyl propenyl carbinol, diallyl carbinol, α-diallyl amine, or allyl amino-4-phenyl-4 butene-1.

2,3-diallyloxy propanol

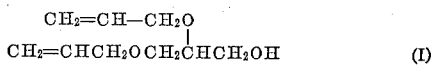 (I)

Allyl propenyl carbinol

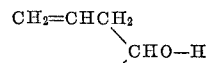

Allyl vinyl carbinol

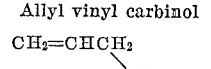

Diallyl carbinol

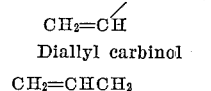

α-Diallyl amine

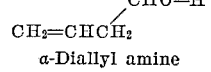

and/or the isomer 1,3-diallyloxy-2-propanol of compound (I)

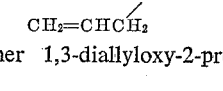

Allyl amino-4-phenyl-4-butene-1

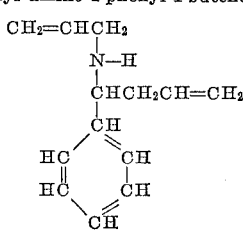

In practice, there are two ways of carrying out the invention, one being to produce an elastomer having a branched structure, the other being to produce an elastomer having a linear structure. In the linear elastomer, there are two terminal groups, whereas in the branched chain molecule there may be $x$ number of terminal groups. In this latter instance, the degree of branching ($r$) shall be defined as equal to the number of terminal groups of the branched chain molecule ($x$) minus the number of terminal groups in the linear molecule, which latter number equals 2. In other words, the degree of branching shall be represented by the formula $r = x - 2$.

In the copending application, Serial No. 19,997, filed April 5, 1960, wherein the branched polyurethanes were vulcanized by the use of polyisocyanates, the free —NCO content in the elastomer prior to stabilization was in the range of from .3 to 2%, and preferably in the range from .5 to 1.5%. This was necessary to effect a degree of branching wherein $r$ was in the range of from 1 to 17, and preferably in the range of from 3 to 12. The preferred minimum degree of branching of 3 is desirable to insure satisfactory conditions for baking and for vulcanization by the polyisocyanates.

It has been observed in the present invention wherein the polyurethanes are vulcanized by peroxides, that a linear polyurethane having $r$ equal to 0 and no branching, may be used. However, the upper range for $r$ is retained. Preferably in the present invention, the range of $r$ is from 0 to 12.

In the preparation of the branched elastomer, that is, the first embodiment of the invention, there is introduced into the reaction mixture, a polymeric dihydroxy compound, hereinafter designated by HO—P—OH, an organic diisocyanate, hereinafter designated

OCN—D—NCO the unsaturated compound which is monofunctional with respect to diisocyanates, described above, and additionally, a saturated bifunctional compound hereinafter designated by the general formula H—B—H, the purpose of which is to promote the branching of the elastomer and the formation of allophanic esters and biurets. Examples of the saturated bifunctional compounds are water, diols, diamines, aminoalcohols, diacids, preferably having a molecular weight less than 250, and specifically, water, butane, diol, neopentyl glycol, ethanolamine, ethylene diamine, and adipic acid.

With respect to the second embodiment of the invention, that is, the production of a linear elastomer, a saturated bifunctional compound is not used.

A variant of the second embodiment, to produce the linear elastomer, comprises introducing supplementary unsaturations into the reaction mixture by the use of a non-saturated bifunctional compound of the general formula

or

wherein:

Z, $Z_1$ and $Z_2$ are, as above, identical or different monovalent organic radicals having a double bond, and are preferably aliphatic radicals containing not more than ten carbon atoms. As a general practice, Z, $Z_1$ and $Z_2$ are vinyl and allyl radicals, and may comprise aromatic, ether, carboxyl, and carbonyl groups, as other substituents inert with respect to diisocyanates.

$Q_1$ and $Q_2$ are trivalent and tetravalent radicals respectively; and

H represents the substitutable hydrogen atom of two terminal functions reactive with diisocyanates, of the trivalent and tetravalent radicals $Q_1$, and $Q_2$. Again the terminal functions may be OH, $NH_2$, $CONH_2$, SH, and COOH.

Examples of suitable non-saturated bifunctional compounds are a diamine, and an aminoalcohol, or preferably, a diol comprising one or two unsaturated univalent aliphatic radicals. Examples of unsaturated bifunctional compounds are allyloxy propane diol; a mixture of allyloxy propane diols; 1,5-hexadiene-3,4-diol; 2,6-octadiene-4,5-diol; 1-butene-3,4-diol; or 2-pentene-4,5-diol.

Allyloxy propane diol

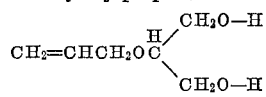

a mixture of allyloxy propane diols;

1,5-hexadiene-3,4-diol

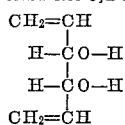

2,6-octadiene-4,5-diol

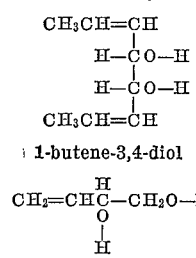

1-butene-3,4-diol

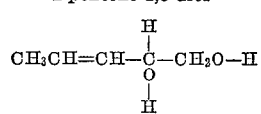

2-pentene-4,5-diol $$CH_3CH=CH-\underset{\underset{H}{\overset{|}{O}}}{\overset{H}{\underset{|}{C}}}-CH_2O-H$$

The purpose of the unsaturated bifunctional compound is to introduce supplementary unsaturations into the compound to impart to the elastomer improved characteristics, principally a wide range of moduli of elasticity, while retaining a constant resistance against heat. Without the unsaturated bifunctional compound, for instance, in connection with the branched elastomer, the heat resistance obtained is generally inversely proportional to the modulus of elasticity obtained.

For the purpose of this invention, the polymeric dihydroxy compound, HO—P—OH, shall be a polyester, a polyether, a polyester amide, or similar compound customarily used in the preparation of polyurethanes, having a molecular weight of from 750 to 10,000. The molecular weight should be, preferably, in the range of from 750 to 5,000, and, in the case of the polyester, preferably, between 1,200 and 3,500.

The diisocyanate OCN—D—NCO is preferably an aromatic diisocyanate such as for example, 3,3'-dimethyl-4,4'-biphenylene diisocyanate; 4,4'-diphenyl methane diisocyanate; 2,4-toluene diisocyanate; 4,4'-diphenyl diisocyanate; paraphenylene diisocyanate; or a mixture of these.

In the preparation of the branched chain molecule, it is important that the molecular ratio of the monofunctional compound in relation to the non-stabilized elastomer be equal to $r+2$, whereas, $r$ may be from 0 to 17, and preferably from 0 to 12. In other words, the molecular proportion of the monofunctional compound relative to the non-stabilized elastomer is from 2 to 19, and preferably from 2 to 14 molecules of the monofunctional ingredient per molecule of elastomer.

Also, if it were desirable to use an excess of diisocyanate, OCN—D—NCO, the amount of diisocyanate relative to the non-stabilized elastomer would be determined by the formula $r/2$. Further, the ratio of the saturated bifunctional compound, designated as H—B—H, used to promote branching, or formation of groups as allophanic esters or biurets, relative to the non-stabilized elastomer, should be preferably within the range of from $.5r$ to $4r$.

It must be remembered that a polyester used in connection with the present invention generally has a water content of from .01 to .15%. Thus, any evaporation of the water must be taken into account in calculating the above ratios of the various constituents. This procedure is well known by those skilled in the art.

In practicing the invention, two procedures may be followed, and affect, to a certain extent, the particular components used, and specifically, the particular unsaturated monofunctional compounds used, principally whether an amine or an alcohol is used. This is necessary because of the different types of reactions of alcohols and amines.

One procedure is to react all of the compounds simultaneously with the exception of the unsaturated monofunctional component, to produce a chemically unstable elastomer. Subsequently, in a reaction which resembles stabilization, the unsaturated monofunctional component is introduced. Amines are preferred in this procedure, since only the amine function reacts with sufficient speed with the free —NCO groups at the ends of the chains to effect suitable stabilization.

The second procedure is to incorporate, simultaneously, all of the components, having thereby a single reaction to form the stabilized elastomer. In this instance, the unsaturated monofunctional component may be either an amine or an alcohol.

To obtain the final desired product, an organic peroxide, or other peroxides well known to those skilled in the art, is added to the elastomer. An example of a suitable peroxide is dicumyl peroxide, marketed under the trade name DI CUP, manufactured by the Hercules Powder Company. After addition of the peroxide, the elastomer is cured under pressure, preferably in excess of 10 kg./cm.$^2$, at temperatures between 140 and 160° C., to produce a product of satisfactory characteristics. In general, with respect to resistance against rupture, the resistance is increased proportionately to an increase in degree of branching effected in the elastomer.

The resistance against rupture, and other characteristics of the vulcanized products, may be improved by the use of fillers, for instance carbon black. For instance the addition of carbon black increases the resistance of the elastomer to abrasion.

A low or zero degree of branching may provide an elastomer which has a higher resistance to deterioration by heat. This can be shown by testing the extent of relaxation of tension of the vulcanized elastomer at a constant elongation, and at temperatures close to 150° C. It was noted that the resistance to relaxation of tension increased as the degree of branching of the elastomer was decreased. This is attributable mainly to the absence of the allophanate or biuret groups, the apparent cause of deterioration of the urethane rubbers vulcanized by diisocyanates at temperatures higher than 150° C.

The resilience and the resistance to heating of the rubbers obtained according to the present invention, when submitted to repeated bendings, are excellent, but depend as do conventional elastomers on the rate of load.

The following examples are illustrative of the invention. It should be noted that the formulation stated in the examples were all arrived at as a result of a multiple number of experiments in which the ratios of the constituents were varied about theoretically calculated values.

In the examples, it is to be understood that all reference to parts of reaction components used will be deemed to mean parts by weight.

EXAMPLE 1

100 parts of a polyester formed from ethylene and propylene glycol and adipic acid (three parts ethylene to one part propylene) having a hydroxyl number of 82.8 and an acid number of 0.7 and 10 parts of tricresyl phosphate are caused to react under stirring for 60 minutes at 90° C. with 29 parts of 3,3'-dimethyl-4,4'-biphenylene diisocyanate in the presence of 0.03 part of ferric chloride and 1% total weight of magnesia as catalysts. The tricresyl phosphate used above acts as a plasticizer.

Thereafter, there are added 1.5 parts of 1,4-butanediol. After good homogenization of the mixture, the mixture is transferred to a tank and cured at 120° C.

The rubber obtained is stabilized by thoroughly mixing with it in a roll mixer 1.9 parts of diallyl amine.

EXAMPLE 2

Method identical to that of Example 1. However, the diallyl amine is added at the same time as the 1,4-butanediol. These two examples illustrate the two procedures which may be followed in practicing the invention, and in this latter instance, the stabilization step is eliminated.

The urethane elastomers prepared in accordance with Examples 1 and 2 show the same characteristics of plasticity and stability. The characteristics of the vulcanizing products obtained following incorporation into 100 parts of the elastomer of 15 parts Philblack A black, a carbon black, and 4 parts "Di-cup 40" whereafter baking is effected for 30 minutes at 154° C. under 15 kg./cm.$^2$ may be compared by referring to the general table. At the end of 30 minutes at 110° C. the Mooney fixation is zero.

EXAMPLE 3

(a) 1000 parts of a polyester formed from ethylene and propylene glycol and adipic acid (three parts ethylene to one part propylene) hereinafter referred to as mixture (I), with a hydroxyl number of 71 and an acid number of 1.4, dehydrated for 30 minutes at 130° C. under 20 mm. mercury, and 62 parts of diallyl amine are mixed at 60° C. After good homogenization of the mixture, 111 parts 2,4-toluene diisocyanate are added.

At the end of 15 minutes of stirring, the temperature reaches 100–110° C. Then 1.5 parts of quinoline are added, as a catalyst.

Temperature and mixing are continued for 30 minutes. The unsaturated alcohol, mixture (II) obtained, is a product which is stable when stocked.

(b) 100 parts of the polyester (I) and 100 parts tricresyl phosphate are caused to react under stirring for 60 minutes at 90° C. with 253 parts of 3,3'-dimethyl-4,4'-biphenylene diisocyanate, in the presence of 0.3 parts of ferric chloride and 10 parts of magnesia as catalysts.

While the temperature is 110° C., there is added 330 parts of the unsaturated alcohol (II), 9.1 parts of neopentyl glycol and 1.5 parts of quinoline. When the mixture is well homogenized, it is transferred to a tank and baked at 120° C. for 15 to 20 hours. In that way, there is obtained a rubber which can be well worked in a roll mixer (temperature of the rolls 50–60° C.).

The Mooney viscosity of this elastomer (20 Mooney units at 100° C.) remained unchanged at the end of one year's storage.

(c) Following incorporation into 100 parts of this elastomer of 20 parts of Philblack I black and 8 parts of "Di-cup 40," there is obtained a mixture which may be used for all conventional rubber operations and which can be molded and vulcanized.

The Mooney determination of this mixture at the end of 30 minutes at 110° C. is zero.

The Mooney viscosity (25 Mooney units at 100° C.) remains unchanged after a year's storage.

Vulcanization is effected under a pressure of 15 kg./cm.$^2$ at 154° C. during 30 minutes (note characteristics in the general table).

As regards the heating measurements with respect to the Goodrich flexometer (load: 100 p.s.i.; course: 0.25 inch; cycles: 1,560/minute; test temperature: 38° C.; duration of test: 20 minutes), there are given below the increase in surface temperature of the test tube in Δ ° C. and the percentage of permanent deformation for the different formulae of vulcanization. The variations are related to the ratios of carbon black and peroxide used (expressed in parts per 100 parts of rubber).

| Formula of the mixture | | Data in the flexometer | |
|---|---|---|---|
| Philblack I | Di-Cup 40 | Δ ° C. | Permanent deformation, percent |
| 10 | 6 | 18 | 0.80 |
| 20 | 6 | 29 | 1.57 |
| 30 | 6 | 42 | 7.90 |
| 10 | 7 | 17 | 0.78 |
| 20 | 7 | 27 | 2.00 |
| 30 | 7 | 43 | 9.01 |
| 10 | 8 | 17 | 0.78 |
| 20 | 8 | 27 | 1.17 |
| 30 | 8 | 37 | 4.69 |

EXAMPLE 4

To 1000 parts of a mixed ethylene and propylene polyadipate (ethylene glycol: 3; propylene glycol: 1) with a hydroxyl number of 41.9 and an acid number of 1.2, dehydrated for 30 minutes at 130° C. under a 20 mm. mercury column, there is added 0.3 part of ferric chloride, 13 parts of diallyloxy propanol, 2.2 parts of 1,4-butanediol.

After this mixture has been well homogenized by stirring there is added, at 70° C., 112 parts diphenyl methane-4,4'-diisocyanate. After 10 minutes of agitation, the thick liquid is transferred to a tank and heated at 120° C. for 5 hours, and an elastomer, the Mooney viscosity of which at 100° C. is 20, is obtained.

EXAMPLE 5

To 1000 parts of a mixed ethylene and propylene polyadipate (ethylene glycol: 3; propylene glycol: 1) with a hydroxyl number of 69.3 and an acid number 2.1, which had been dehydrated for 30 minutes at 130° C. under a 20 mm. mercury vacuum, there is added 1 part 1,4-butanediol and 14 parts diallyl oxypropanol. After this mixture has been well homogenized one adds under agitation and at 70° C., 172 parts diphenyl methane-4,4'-diisocyanate. After 10 minutes of agitation, the thick liquid is transferred to a tank and heated at 120° C. for 10 hours. Thus there is obtained an elastomer the plasticity of which makes it easily worked in a roll mixer at 50°–60° C., and which has a Mooney viscosity equal to 23 at about 100° C.

EXAMPLE 6

To 1000 parts of the polyester used in Example 5 the water content of which, however, is between 0.03 and 0.06%, there is added 11.6 parts diallyloxy propanol. To this mixture, there is added, under agitation and at 70° C., 176 parts diphenyl methane-4,4'-diisocyanate. After 10 minutes of agitation the thick liquid is transferred to a tank and heated at 120° C. during 10 hours. One obtains an elastomer the appearance of which resembles that of the preceding examples.

EXAMPLE 7

To 1000 parts of a polyester prepared in accordance with Example 5 and dehydrated at 130° C. under a 20 mm. mercury column, 0.3 part of ferric chloride, 10.3 parts of diallyloxy propanol and 3.9 parts of allyloxy propanediol are mixed and completely homogenized at 70° C.

Thereafter, 176 parts of diphenyl methane-4,4'-diisocyanate are added and the mixture is continuously agitated for 10 minutes. After that, the viscous mass is transferred to a tank and heated at 120° C. for 5 hours, producing a urethane rubber (VII) which has a plasticity which is compatible with its being worked in roll mixers at 50°–60° C. (Mooney viscosity at 100° is 21.)

EXAMPLE 8

1000 parts of the polyester prepared in accordance with Example 5, 0.3 part of ferric chloride, 10 parts of magnesia, 3.9 parts of allyloxy propanediol and 10.3 parts of diallyloxy propanol are mixed and homogenized at 90° C.

187 parts 3,3'-dimethyl-4,4'-biphenylene diisocyanate are added to the preceding mixture. After agitation for 30 minutes the viscous liquid is transferred to a tank and subjected to heating at 120° C. for 12 hours, producing an elastomer (VIII) which in its appearance and plasticity is comparable to that of Example 7.

EXAMPLE 9

To 1000 parts of a mixed ethylene and propylene polyadipate (ethylene glycol: 3; propylene glycol: 1) with a hydroxyl number of 41.9 and an acid number of 1.2, dehydrated for 30 minutes at 130° C. under a 20 mm. mercury column, there is added 0.3 part ferric chloride and 8.5 parts diallyloxy propanol.

After good homogenization there is incorporated at 70° C., 105 parts diphenyl methane-4,4'-diisocyanate. Agitation is effected for 10 minutes after which the viscous liquid which is obtained is transferred to a tank and heated at 120° C. for 5 hours, producing an elastomer (IX) whose appearance is identical to that of the preceding elastomers.

EXAMPLE 10

This example is identical with Example 9, but for the purpose of comparison, the diallyloxy propanol is substituted by 7.5 parts of geraniol.

The vulcanized product has very mediocre characteristics (note hysteresis loss and rupture, in the general table), and illustrates the preparation of a product by the use of an unsaturated monofunctional component which does not fall within the definition stated in accordance with the invention.

EXAMPLE 11

To 1000 parts of a mixed ethylene and propylene polyadipate (ethylene glycol: 3; propylene glycol: 1) with a hydroxyl number of 34.6 and an acid number of 0.2, dehydrated for 30 minutes at 130° C. under 20 mm. of Hg, there is added 0.3 part of ferric chloride and 6.9 parts of diallyloxy propanol.

After good homogenization, 80.5 parts diphenyl methane-4,4'-diisocyanate are incorporated at 70° C. The mixture is agitated for 10 minutes and the viscous liquid obtained is transferred to a tank and heated at 120° C. for 5 hours, producing an elastomer (XI), which has a plasticity permitting its being worked in a roll mixer at 60° C.

EXAMPLE 12

To 1000 parts of a mixed ethylene and propylene polyadipate identical with one of the preceding example, dehydrated for 30 minutes at 130° C. under 20 mm. Hg, 0.3 part of ferric chloride and 3.85 parts of allyl vinyl carbinol are added. After homogenization, 82.5 parts diphenyl methane-4.4'-diisocyanate are added at 70° C. The mixture is agitated for 10 minutes and transferred to a tank and heated at 120° C. for 5 hours. An elastomer (XII) is thus obtained.

EXAMPLE 13

To 1000 parts of mixed ethylene and propylene polyadipate as used in the preceding tests there are added under the same conditions and in accordance with the same manner of operation 0.3 part ferric chloride, 4.4 parts diallyl carbinol and 81.5 parts diphenyl methane diisocyanate. After heating there is obtained an elastomer (XIII) which as regards its plasticity and its performance in the roll mixer, is identical with the preceding elastomers.

EXAMPLE 14

To 1000 parts of a polyester identical with the one in Examples 11, 12 and 13, are added 0.3 part ferric chloride and 2.26 parts allyl amine, and homogenization is effected at 40° C. After 81.5 parts diphenyl methane-4,4'-diisocyanate have been incorporated under agitation, the temperature rises by itself. At the end of 10 minutes, the viscous mixture is transferred to a tank and heated at 120° C. during 5 hours, producing an elastomer (XIV).

This example, similar to example 10 using geraniol, is destined to illustrate by comparison the mediocre properties of products produced using a mono-functional unsaturated component not covered by the definition in accordance with the invention.

EXAMPLE 15

To 1000 parts of mixed ethylene and propylene polyadipate (ethylene glycol: 3; propylene glycol: 1) with a hydroxyl number of 35.7 and an acidity number of 0.3, dehydrated for 30 minutes at 130° C., 0.3 part ferric chloride and 8.15 parts allylamino-4 phenyl-4-butene-1 are incorporated. After homogenization at 70° C., 92 parts diphenyl methane-4,4'-diisocyanate are added. After heating as in the two preceding examples, an elastomer (15) is obtained.

Improved resistance to thermic deterioration of the vulcanized products is demonstrated by comparison of the "time of relaxation" of tension, at constant elongation, of the various vulcanized rubbers, especially the polyurethane rubbers vulcanized with either diisocyanates or peroxides.

"Time of relaxation" for the purposes of this application, shall be defined as the time (expressed in minutes) at the end of which the tension reaches one half of its initial value.

The rubber test piece of a width of 1 mm. is submitted to elongation of 50% and heated by air.

The following table gives the time of relaxation at 140° C. and 160° C., in that order. The rubbers vulcanized with peroxides have been separated into two groups differing by the degree of branching r of the original elastomer. It will be observed that a particularly high time of relaxation is obtained with lower degrees of branching, and reaches 200 minutes at 160° C. for r=0.

| Vulcanized rubbers | Times of relaxation (min.) at— | |
|---|---|---|
| | 140° C. | 160° C. |
| Natural rubber | 23 | 4 |
| Styrene butadiene rubber (GRS) | 35 | 10 |
| Vulcanized polyurethanes with diisocyantes | 18 | 3 |
| Vulcanized polyurethanes with perioxides (2<r<4) | 30 to 50 | 9 to 20 |
| Vulcanized polyurethanes with peroxides (0<r<1) | >100 | 30 to 200 |

These results represent the medians of a large number of measurements of various rubbers the conditions of vulcanization of which were varied. Obviously, these were rubbers charged with carbon black, except for the polyurethanes vulcanized with diisocyanates.

In the following table the charcteristics of the products prepared in accordance with Examples 1 to 15 above has been summarized.

General Table of Characteristics of Vulcanizates

| Example or vulcanizate | Phil black I | Di-Cup 40 | Modulus of elasticity (at 150% in g./mm.²) | Hysteresis loss at 20° C. | Rupture in kg./mm.² | Elongation in percent |
|---|---|---|---|---|---|---|
| 1 | 15 | 4 | 210 | 15.5 | 3.6 | 550 |
| 2 | 15 | 4 | 240 | 15.5 | 3.51 | 535 |
| 3 | 20 | 8 | 260 | [1] 17.4 | 3.6 | 420 |
| 4 | 20 | 8 | 227 | 18.5 | 3.7 | 440 |
|   | 30 | 8 | 257 | 28.5 | 3.9 | 395 |
| 5 | 20 | 8 | 224 | 17 | 4.3 | 520 |
|   | 30 | 8 | 220 | 27 | 4.1 | 510 |
| 6 | 20 | 8 | 229 | 17.5 | 4.1 | 570 |
|   | 30 | 8 | 250 | 29 | 3.8 | 440 |
| 7 | 20 | 6 | 176 | 17.4 | 3.52 | 460 |
|   | 30 | 6 | 214 | 30.5 | 3.72 | 405 |
| 8 | 20 | 6 | 250 | 19.3 | 3.22 | 360 |
|   | 30 | 6 | 290 | 24.5 | 3.24 | 287 |
| 9 | 20 | 6 | 178 | 12 | 4.1 | 425 |
|   | 30 | 6 | 208 | 15.6 | 3.5 | 395 |
| 10 [2] | 20 | 6 | 94 | 23.8 | 2.2 | 600 |
|   | 30 | 6 | 118 | 35.7 | 2.6 | 365 |
| 11 | 20 | 6 | 147.3 | 14.76 | 3.68 | 445 |
|   | 30 | 6 | 193.6 | 21.8 | 4.07 | 510 |
| 12 | 20 | 6 | 157.3 | 17.78 | 3.34 | 420 |
|   | 30 | 6 | 195.6 | 25.23 | 3.51 | 465 |
| 13 | 20 | 6 | 129 | 16.13 | 3.64 | 475 |
|   | 30 | 6 | 182 | 25.8 | 3.9 | 500 |
| 14 [2] | 20 | 6 | 126 | 30.33 | 1.47 | 430 |
|   | 30 | 6 | 187 | 40.6 | 2.63 | 475 |
| 15 | 20 | 6 | 125.6 | 16.6 | 3.47 | 330 |
|   | 30 | 6 | 151.6 | 24.43 | 3.56 | 325 |

[1] In this example, the resilience at 60° C. (measurement of rebound action) is 88%.
[2] In these examples unsaturated monofunctional compounds used does not fall within that defined according to the concepts of the invention

We claim:

1. The process for the preparation of a stable di-terminally unsaturated branched chain polyurethane elastomer which comprises the steps of (1) mixing and heating at a temperature from about 70° C. to about 90° C. for from about 10 to about 60 minutes (a) a saturated polymeric dihydroxy compound having a molecular weight of 750 to 10,000, (b) an organic diisocyanate, and (c) a saturated bifunctional compound having a molecular weight below about 250 selected from the group consisting of water, diols, diamines, amino-alcohols and dicarboxylic acids thereby forming a homogenized liquid mixture of (a), (b) and (c) and further heating said homogenized liquid mixture at a temperature of about 120° C. for from about 5 to about 10 hours thereby forming (d) a branched chain polyurethane elastomer having from 1 to 17 branched chains and having at substantially all terminal portions thereof free isocyanate groups, and (2) reacting by thoroughly mixing at a temperature from about 50° C. to about 60° C. said (d) branched chain polyurethane elastomer with an equivalent amount of (e) a di-ethylenically unsaturated compound which is monofunctional with respect to isocyanate having the formula

where Q is a saturated trivalent radical having the single terminal hydrogen atom H reactive with isocyanate and $Z_1$ and $Z_2$ are monovalent mono-ethylenically unsaturated aliphatic hydrocarbon radicals having up to 10 carbon atoms with the unsaturation being furnished by groups selected from the group consisting of vinyl and allyl to block the free isocyanate groups and thereby form (f) a stable di-terminal unsaturated branched chain polyurethane elastomer.

2. The process as set forth in claim 1 wherein the di-ethylenically unsaturated compound which is monofunctional with respect to isocyanate is a mono-amine.

3. The process as set forth in claim 2 wherein the mono-amine is diallyl amine.

4. The process for the preparation of a stable di-terminally unsaturated branched chain polyurethane elastomer which comprises mixing and heating at a temperature from about 70° C. to about 90° C. for from about 10 to about 60 minutes (a) a saturated polymeric dihydroxy compound having a molecular weight of 750 to 10,000, (b) an organic diisocyanate, (c) a saturated bifunctional compound having a molecular weight below about 250 selected from the group consisting of water, diols, diamines, amino-alcohols and dicarboxylic acids, and an equivalent amount of (e) a di-ethylenically unsaturated compound which is monofunctional with respect to isocyanate having the formula

where Q is a saturated trivalent radical having the single terminal hydrogen atom H reactive with isocyanate and $Z_1$ and $Z_2$ are monovalent mono-ethylenically unsaturated aliphatic hydrocarbon radicals having up to 10 carbon atoms with the unsaturation being furnished by groups selected from the group consisting of vinyl and allyl thereby forming a homogenized liquid mixture of (a), (b), (c) and (e) and further heating said homogenized liquid mixture at a temperature of about 120° C. for from about 5 to about 10 hours thereby forming (f) a stable di-terminally unsaturated branched chain polyurethane elastomer having from 1 to 17 branched chains and having at substantially all terminal portions thereof blocked isocyanate groups.

5. The process as set forth in claim 4 wherein the di-ethylenically unsaturated compound which is monofunctional with respect to isocyanate is a monohydric alcohol.

6. The process as set forth in claim 5 wherein the monohydric alcohol is selected from the group consisting of diallyloxy propanol, allyl vinyl carbinol, allyl propenyl carbinol and diallyl carbinol.

7. The process as set forth in claim 1 which comprises the further step (3) of heating at a temperature from about 140° C. to about 160° C. for about 30 minutes and at a pressure at least about 10 kilograms per square centimeter the (f) stable di-terminally unsaturated branched chain polyurethane elastomer with (g) an organic peroxide to form thereby a vulcanizate.

8. The process as set forth in claim 7 wherein the organic peroxide is dicumyl peroxide.

9. The stable di-terminally unsaturated branched chain polyurethane elastomer produced by the process of claim 1.

10. The polyurethane vulcanizate produced by the process of claim 7.

References Cited in the file of this patent
UNITED STATES PATENTS
2,820,020    Franko-Filipasic _____ Jan. 14, 1958